(12) United States Patent
Chagoly et al.

(10) Patent No.: US 8,032,627 B2
(45) Date of Patent: Oct. 4, 2011

(54) ENABLING AND DISABLING BYTE CODE INSERTED PROBES BASED ON TRANSACTION MONITORING TOKENS

(75) Inventors: Brian C. Chagoly, Austin, TX (US); Xiaoping Chen, Austin, TX (US); Andrew J. Lavery, Austin, TX (US); Kirk M. Sexton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 12/197,769

(22) Filed: Aug. 25, 2008

(65) Prior Publication Data
US 2008/0307418 A1    Dec. 11, 2008

Related U.S. Application Data

(63) Continuation of application No. 11/146,990, filed on Jun. 6, 2005, now Pat. No. 7,464,161.

(51) Int. Cl.
*G06F 15/173* (2006.01)
(52) U.S. Cl. ........ 709/224; 717/124; 717/126; 717/127; 717/129; 717/131; 709/202; 709/220
(58) Field of Classification Search .................. 709/202, 709/220, 224; 717/124, 126, 127, 129, 131
See application file for complete search history.

(56) References Cited

U.S. PATENT DOCUMENTS

| 5,937,190 | A | 8/1999 | Gregory et al. |
| 6,021,117 | A | 2/2000 | Juniper et al. |
| 6,070,190 | A * | 5/2000 | Reps et al. ............. 709/224 |
| 6,457,143 | B1 * | 9/2002 | Yue ............................ 714/43 |
| 6,493,868 | B1 | 12/2002 | DaSilva et al. |
| 6,757,727 | B1 | 6/2004 | Ivory |
| 7,568,019 | B1 * | 7/2009 | Bhargava et al. ............. 709/223 |
| 2003/0056200 | A1 | 3/2003 | Li et al. |
| 2004/0054695 | A1 | 3/2004 | Hind et al. |
| 2004/0088699 | A1 | 5/2004 | Suresh |
| 2004/0123279 | A1 | 6/2004 | Boykin et al. |
| 2005/0251574 | A1 | 11/2005 | Chagoly et al. |
| 2006/0020699 | A1 * | 1/2006 | D'Esposito ............. 709/224 |
| 2006/0089984 | A1 | 4/2006 | Chagoly et al. |
| 2006/0107255 | A1 | 5/2006 | Chagoly et al. |

* cited by examiner

*Primary Examiner* — Michael Won
(74) *Attorney, Agent, or Firm* — Yee & Associates, P.C.; Jeffrey S. LaBaw (57) ABSTRACT

A method of enabling transaction probes used to monitor a transaction or modify a primary application handling the transaction. The method begins with retrieving a token associated with the transaction. The token contains information regarding which transaction probes from a plurality of transaction probes will be enabled with respect to the transaction. The token is then read to determine the set of transaction probes from the plurality of transaction probes that will be enabled. The determined set of transaction probes is then enabled.

20 Claims, 5 Drawing Sheets

ENABLING AND DISABLING BYTE CODE INSERTED PROBES BASED ON TRANSACTION MONITORING TOKENS

This application is a continuation of application Ser. No. 11/146,990, filed Jun. 6, 2005, status pending.

BACKGROUND OF THE INVENTION

1. Field of the Invention

The present invention relates generally to an improved data processing system and in particular to a method and apparatus for processing data. Still more particularly, the invention relates to using monitoring tokens to disable byte code inserted probes associated with transactions in a data processing system.

2. Description of the Related Art

A key task in system administration is to monitor the performance and availability of software applications, including those that may spread across multiple physical systems involving multiple physical resources. Typically, probes perform monitoring. Probes may also be used to modify a software application or perform operations in addition to the application's regular operations. Probes are programs for monitoring or otherwise modifying the primary application. However, the use of probes causes some run-time performance overhead on the primary software application, which may cause the primary software application to run more slowly. In view of the fact that often not all probes need be active at once, it is desirable to provide a control mechanism to control whether one or more probes are active.

A current method for controlling probes is to use instrumentation technologies, such as just in time instrumentation, to enable or disable all probes. In addition, a token may be used to control how individual probes are active with respect to the primary software application. An example of a token and its use in transaction monitoring may be found in our U.S. application Ser. No. 10/971,472, filed Oct. 22, 2004, which is hereby incorporated by reference.

However, current methods of controlling probes still require resource overhead that may slow the primary application or otherwise reduce its performance. Resource overhead is the amount of resources required by a data processing system to perform a task, such as to execute a primary application or execute a probe. Thus, it would be advantageous to have a method, apparatus, and data processing system for further reducing the resource overhead required to implement a set of probes with respect to a primary application.

SUMMARY OF THE INVENTION

The present invention provides a method, apparatus. and computer instructions for enabling transaction probes used to monitor a transaction or modify a primary application handling the transaction. A token associated with the transaction is retrieved. The token contains information regarding which transaction probes from a group of transaction probes are to be enabled with respect to the transaction. The token is then read to identify the set of transaction probes from the group of transaction probes that will be enabled. The identified set of transaction probes is then enabled.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
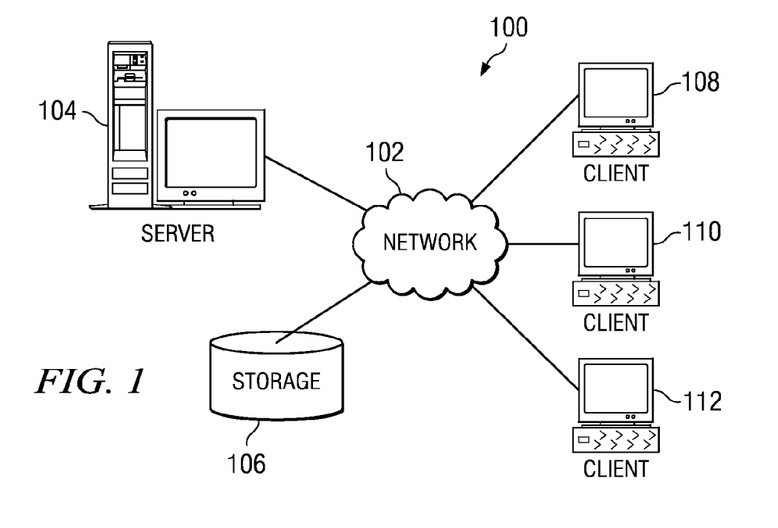
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
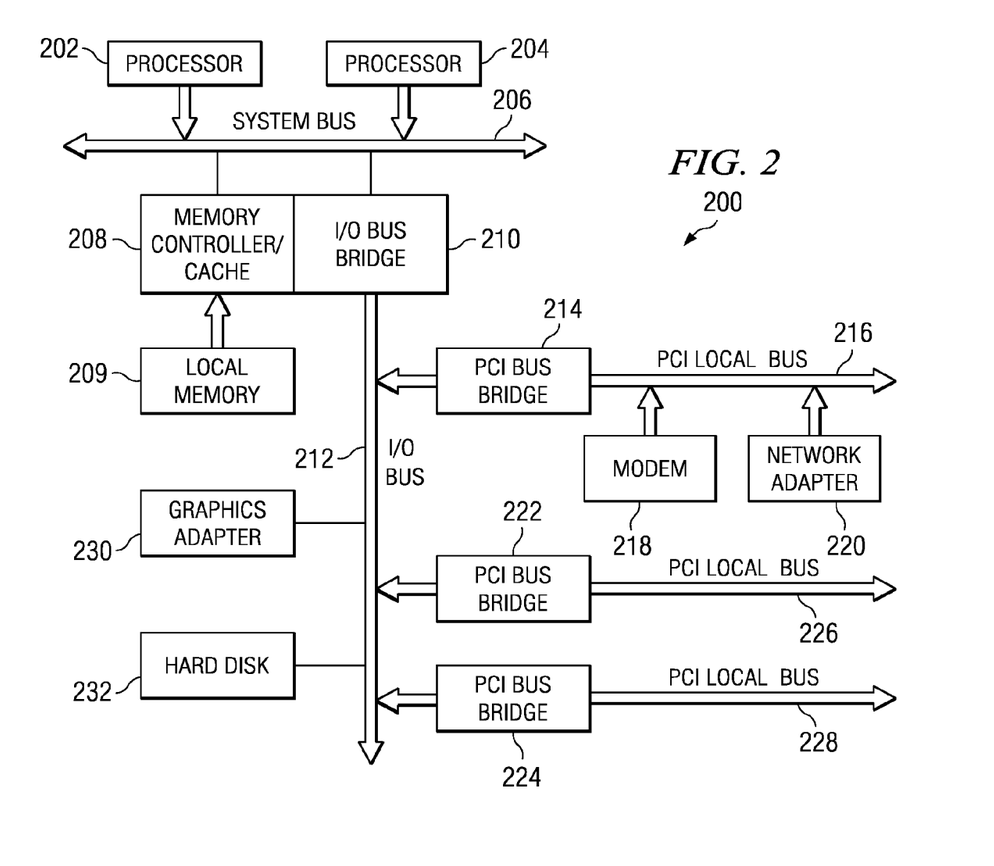
FIG. 2 is a block diagram of a data processing system that may be implemented as a server in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
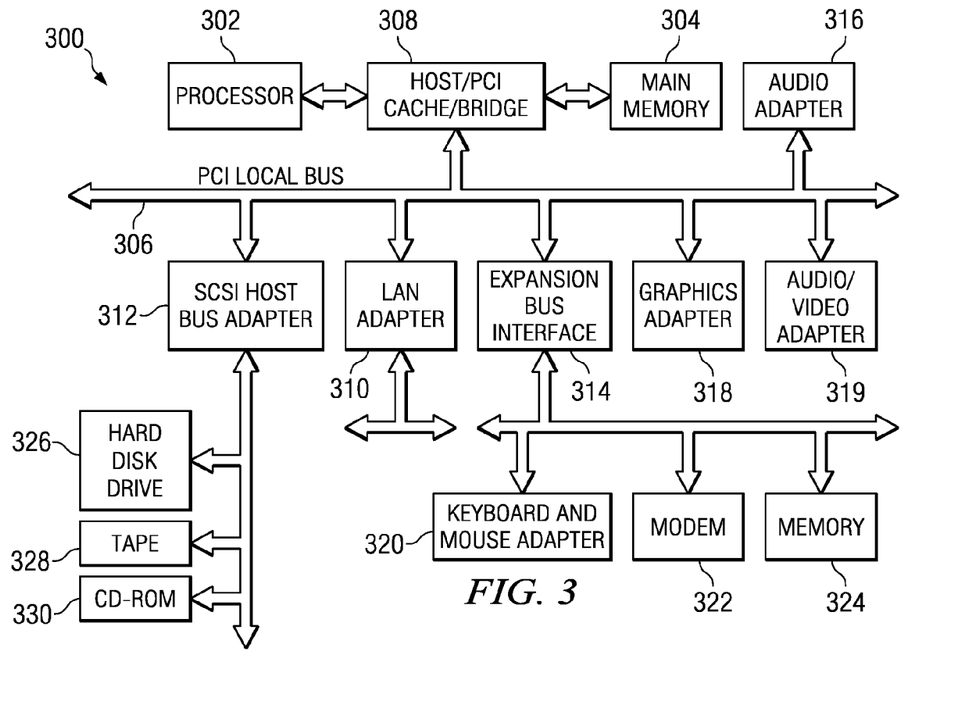
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. In addition, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for enabling transaction probes used to monitor a transaction or modify a primary application handling the transaction. The method begins with retrieving a token associated with the transaction. The token contains information regarding which transaction probes from a group of transaction probes will be enabled with respect to the transaction. The token is then read to determine the set of transaction probes from the group of transaction probes that will be enabled. The determined set of transaction probes is then enabled.

Figure 4:
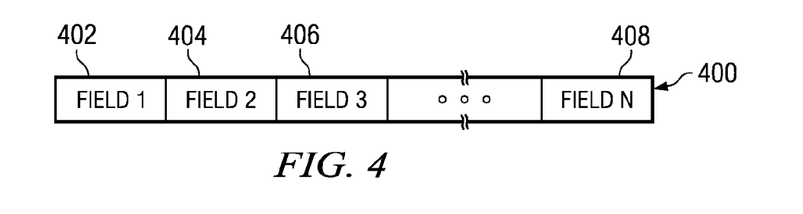
FIG. 4 is a block diagram illustrating the use of tokens and entry point probes to selectively enable transaction probes associated with each transaction entering an entry point of a primary application in accordance with a preferred embodiment of the present invention.

FIG. 4 is a block diagram illustrating the use tokens and entry point probes to selectively enable transaction probes associated with each transaction entering an entry point of a primary application in accordance with a preferred embodiment of the present invention. Primary application 400 is executed on one or more data processing systems, such as server 104 or clients 108, 110, and 112 in FIG. 1, client system 200 in FIG. 2, or server system 300 in FIG. 3.

A token is associated with the primary program and with a transaction probe. A token may contain information regarding which transaction probes should be activated with regard to the primary application. For example, a token may be associated with a program designed to analyze Internet traffic on a server and also with a transaction probe designed to monitor the performance of the program. Tokens 436, 438, 440, and 446 each have a structure similar to that shown in token 500 in FIG. 5. Operation of tokens with respect to the present invention is described further below.

Primary application 400 has a number of entry points, including entry point 1 402, entry point 2 404, and entry point N 406. Entry point N 406 is shown to illustrate that the primary application may have a predetermined or dynamically determined number of entry points. Each entry point is the point where primary application 400 begins to process a particular transaction. A transaction may be any function performed by primary application 400. Examples of transactions include, but are not limited to, fund transfers in banking systems, orders for goods made via the Internet, entry or processing of data, or any other transaction performed by software or hardware.

In the illustrative example shown in FIG. 4, two transactions, transaction 1 408 and transaction 2 410, arrive at entry point 402. One transaction, transaction 3 412, arrives at entry point 2 404. Primary application 400 has a large group of transaction probes 413 that may be applied to monitor or otherwise affect primary application 400 and/or the transactions that arrive at the various entry points in primary application 400. An entry point probe is used to detect the arrival of a transaction at an entry point.

In this illustrative example, group of transaction probes 413 includes transaction probe 1 414, transaction probe 2 416, transaction probe 3 418, transaction probe 4 420, transaction probe X 422, transaction probe X+1 424, transaction probe X+2 426, and transaction probe X+Y 428. Transaction probes X 422 and transaction probes X+Y 428 are shown to illustrate that group of transaction probes 413 may include a large number of transaction probes associated with primary application 400. As described above, a transaction probe includes a monitoring probe or a probe designed to modify, enhance, or otherwise change a transaction or the operation of primary application 400 with respect to a particular transaction.

In this illustrative example, transaction 1 408 only requires that transaction probe 1 414 and transaction probe 2 416 be enabled. Transaction 2 410 only requires that transaction probe 3 418 be enabled. Transaction 3 412 only requires that transaction probe 1 414, transaction probe 3 418, and transaction probe 4 420 be enabled.

A method of ensuring that each of the needed transaction probes associated with transaction 1 408, transaction 2 410, and transaction 3 412 are enabled is to enable all transaction probes in group of transaction probes 413. However, continuously operating all transaction probes in group of transaction probes 413 may impose an unnecessary burden on the resources of the data processing system supporting primary application 400. In turn, primary application 400 would slow or experience reduced performance.

To solve this problem, a number of entry point probes are associated with the entry points of the primary application. In the illustrative example, entry point probe P1 430 is associated with entry point 1 402 and entry point probe P2 432 is associated with entry point 2 404. However, entry point probe 1 430 and entry point probe 2 432 may be a single entry point probe that monitors both entry point 1 402 and entry point 2 404.

In the illustrative example shown in FIG. 4, transaction 1 408 and transaction 2 410 arrive at entry point 1 402. Entry point probe 1 430 detects the arrival of the two transactions. In conjunction with policy mapper 434, which is provided by a software manufacturer, entry point probe 1 430 retrieves a token associated with transaction 1 408. In this case, entry point probe 1 430 retrieves token 1 436 associated with transaction 1 408 and also retrieves token 2 438 associated with transaction 2 410.

Entry point probe 1 430 then uses token 436 and token 438 to determine that transaction 1 408 requires transaction probe 1 414 and transaction probe 2 416 to be enabled. Similarly, entry point probe 1 430 uses token 438 to determine that transaction 2 410 requires transaction probe 3 418 to be enabled. Entry point probe 1 430 then takes steps to cause the respective transaction probes to be enabled accordingly. Entry point probe 1 430 may enable the respective transaction probes using Boolean operators contained in the transaction probes, as described further below. Thus, entry point probes may be used to minimize the number of transaction probes that are enabled at any particular time.

After transaction 1 408 ends or terminates, transaction probe 1 414 and transaction probe 2 416 may be disabled. A probe disabler thread will disable a particular probe if certain conditions are met, as described in relation to FIG. 8. Similarly, transaction probe 3 418 may be disabled after transaction 2 410 has ended.

Still referring to FIG. 4, when transaction 3 412 arrives at entry point 2 404, entry point probe 2 432 retrieves token 3 440 using policy mapper 434. Entry point probe 2 432 uses token 3 440 to determine that transaction 3 412 requires transaction probe 1 414, transaction probe 3 418, and transaction probe 4 420 be enabled. After transaction 3 412 has ended, transaction probe 1 414, transaction probe 3 418, and transaction probe 4 420 may be disabled by a probe disabling thread, under certain circumstances described in relation to FIG. 8.

In this illustrative example, transaction 1 408, transaction 2 410, and transaction 3 412 may overlap in time. Thus, each transaction may occur at the same time or one transaction may begin as another is in progress. For example, if transaction 1 408 ends before transaction 3 412, then transaction probe 1 414 should continue to operate so long as transaction 3 412 is being processed. In this example, transaction probe 1 414 is either enabled or disabled with regard to all transactions occurring in primary application 400. In other words, only one instance of transaction probe 1 414 is enabled so long as at least one transaction requires transaction probe 1 414 to be enabled.

In another illustrative example, each transaction is monitored and tracked separately, meaning that multiple instances of a probe will be enabled. Thus, for example, two instances of transaction probe 1 414 may operate simultaneously, one instance in relation to entry point 1 402 and one instance in relation to entry point 2 404. Similarly, multiple instances of each transaction probe may operate simultaneously.

Whether or not multiple instances of each transaction probe are operating simultaneously, the mechanism of the present invention provides for minimizing the time that a transaction probe is enabled. For example, if only one instance of a transaction probe is enabled, then all transactions requiring the transaction probe must be terminated before the transaction probe is disabled. In the case of multiple instances of a transaction probe, if transaction 1 408 ends before transaction 3 412, then transaction probe 1 414 with regard to entry point 1 402 may be disabled before transaction probe 1 414 with regard to entry point 2 404 is disabled. Thus, the mechanism of the present invention minimizes the total number of enabled transaction probes. Accordingly, the overhead on the resources of the data processing system operating primary application 400 and the various transaction probes is minimized.

As described above, entry point probe 1 430 and entry point probe 2 432 may be the same entry point probe. In this case, the same entry point probe coordinates enabling of transaction probes with regard to transactions arriving at both entry point 1 402 and entry point 2 404.

The illustrative example described above with regard to entry point 1 402 and entry point 2 404 may be generalized and expanded. A number of transactions 442, transaction X, transaction X+1, and transaction X+2, may arrive at entry point N 406. Entry point probe PN 444 retrieves a corresponding number of tokens 446 from policy mapper 434, depending on the nature of each transaction. Entry point probe PN 444 uses the number of tokens 446 to determine that transactions 442 require transaction probes PX 422, PX+1 424, and PX+2 426. These transaction probes are drawn from the group of transaction probes 413 that includes transaction probe 1 414 through transaction probe X+Y 428. Entry point probe PN 444 may be the same entry point probe as P1 430 and P2 432.

Thus, an entry point probe may detect the arrival of a large number of transactions at various entry points in a primary application, retrieve corresponding tokens from a policy mapping service, use the tokens to determine which transaction probes from a group of transaction probes to enable, and determine how many instances of each transaction probe to enable, and later govern when each instance of each transaction probe is terminated. Accordingly, the set of currently monitored transactions may be collectively used to determine the minimum set of enabled transaction probes.

Using the system shown in FIG. 1 as an illustrative example, client computer 108 requests via network 102 that a business transaction occur in server 104. Specifically, in this illustrative example, a user operating client computer 108 desires to transfer funds from one account to a second account. The vendor bank maintains server 104 and storage 106 to support this request. A banking primary application runs on server 104 and is adapted to handle the transfer of funds. One or more transaction probes operate in conjunction with the banking primary application to monitor the performance of the banking primary application or to modify the operation of the banking primary application with respect to a particular transaction.

When the request from client 108 arrives, the request is forwarded to an appropriate entry point in the primary application. An entry point is the point in a primary application where a transaction begins to be processed.

As described more fully below, an entry point probe detects the incoming transaction from client 108. An entry point probe is similar in structure to a transaction probe, but different in function. An entry point probe is designed to detect the arrival of a transaction, begin the process of monitoring a transaction, and determine what transaction probes are required for the transaction. The entry point probe is always on, unless all probes are disabled.

Alternatively, secondary entry point probes may be used to selectively enable primary entry point probes. Primary entry point probes operate as described above. Secondary entry point probes determine whether primary entry point probes are in use.

Figure 5:
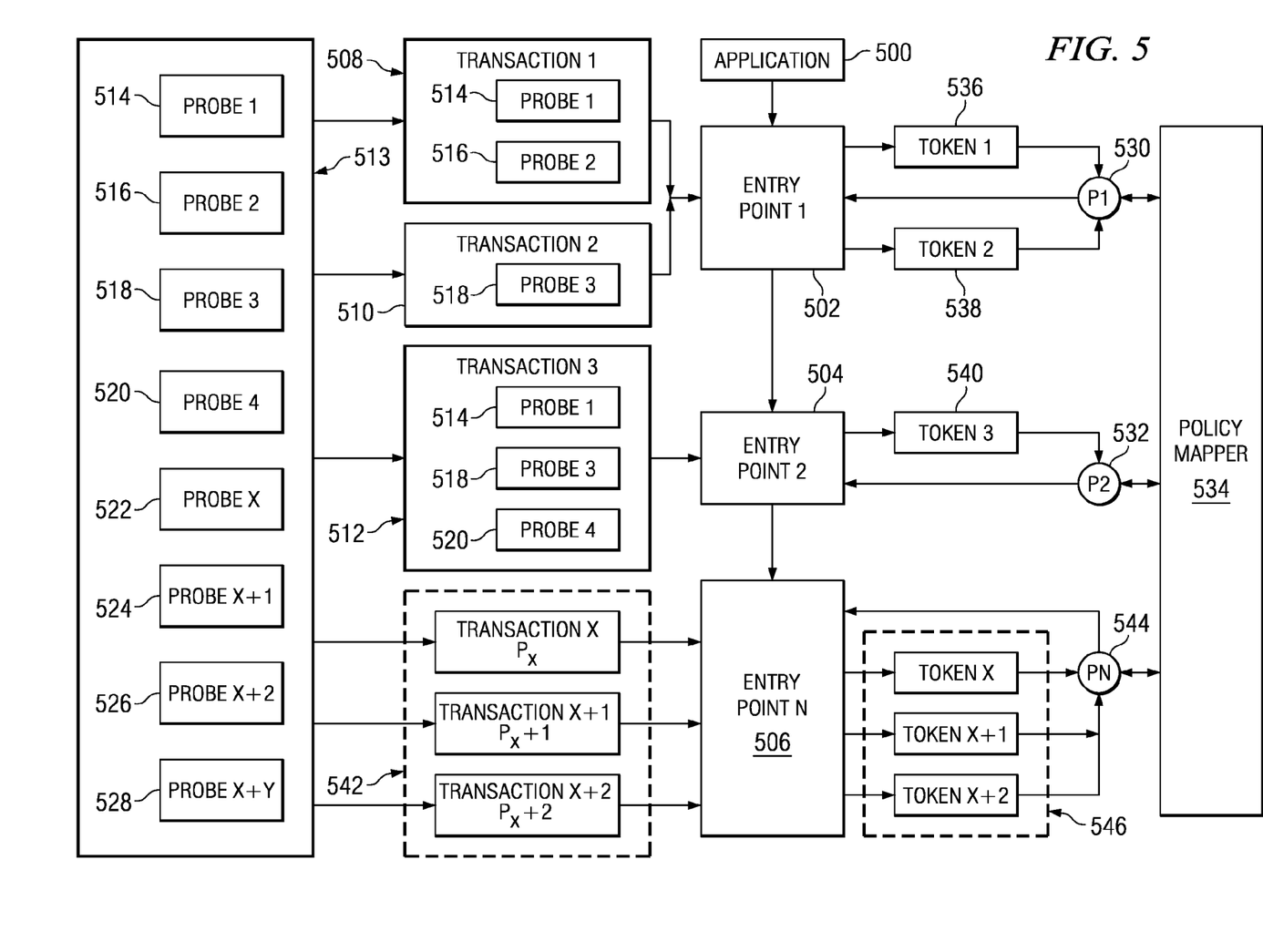
FIG. 5 is a block diagram illustrating a token used in transaction monitoring in accordance with a preferred embodiment of the present invention.

The entry point probe then uses a policy mapping service to retrieve a token, such as token 500, associated with the transaction. In this illustrative example, the token contains data in its fields that indicate that, from all transaction probes available to the primary application, only two transaction probes are necessary for the transaction. The entry point probe then uses the token to enable only the two transaction probes. In the case where a transaction probe is already enabled, then the entry point probe need not take any steps to enable that particular transaction probe.

The transaction probes then monitor the request from client 108 and the operation of the banking primary application as the banking primary application effects the transfer of funds. After the transaction is completed, and assuming no more transactions are pending that require the two transaction probes, then the two transaction probes are disabled to free up resources on server 104 to better process additional functions of the banking primary application. Alternatively, the two transaction probes may remain enabled for a period of time, such as several minutes or more. If a new transaction does not occur within the period of time, then the two transaction probes are disabled using a probe disabler thread, as described in relation to FIG. 8, below. However, if a new transaction that requires one or both transaction probes does occur, then the probes would already be enabled and would continue to remain enabled.

FIG. 5 is a block diagram illustrating a token used in transaction monitoring in accordance with a preferred embodiment of the present invention. Token 500 is associated with a primary application and a transaction probe, such as primary application 400 and transaction probe 1 414 shown in FIG. 4. For example, token 500 may be associated with a program designed to analyze Internet traffic on a server and with a transaction probe designed to monitor the performance of the program. The primary application, the associated entry point probe, and the transaction probes are executed on one or more data processing systems, such as server 104 or clients 108, 110, and 112 in FIG. 1, client system 200 in FIG. 2 or server system 300 in FIG. 3.

Token 500 contains a series of data fields, field 1 502, fields 2 504, field 3 506, and field N 508.

Field N 508 shows that token 500 may have any predetermined or dynamically determined number of fields. Each data field specifies whether and/or how a particular component of the primary application should be monitored or modified during a particular transaction handled by the primary application. For example, a data field may contain a single byte. If the byte reads "1," then the data field indicates that an associated transaction probe should monitor or perform some other function with regard to the transaction. Thus, the transaction probe is enabled. If the byte reads "0," then the data field indicates that an associated probe should not be monitored and should not perform some other function with regard to the transaction. In this instance, the particular transaction probe is not enabled. However, the transaction probe may already be enabled because some other transaction requires the probe to be enabled. In this case, the probe need not be disabled.

Thus, the token and entry point probe may use Boolean operators to decide which probes should be enabled for a given transaction. Other fields in token 500 may contain data that indicate how or what part of a probe should be applied to the primary application. Token 500 may be used in any of the tokens shown in FIG. 4.

Figure 6:
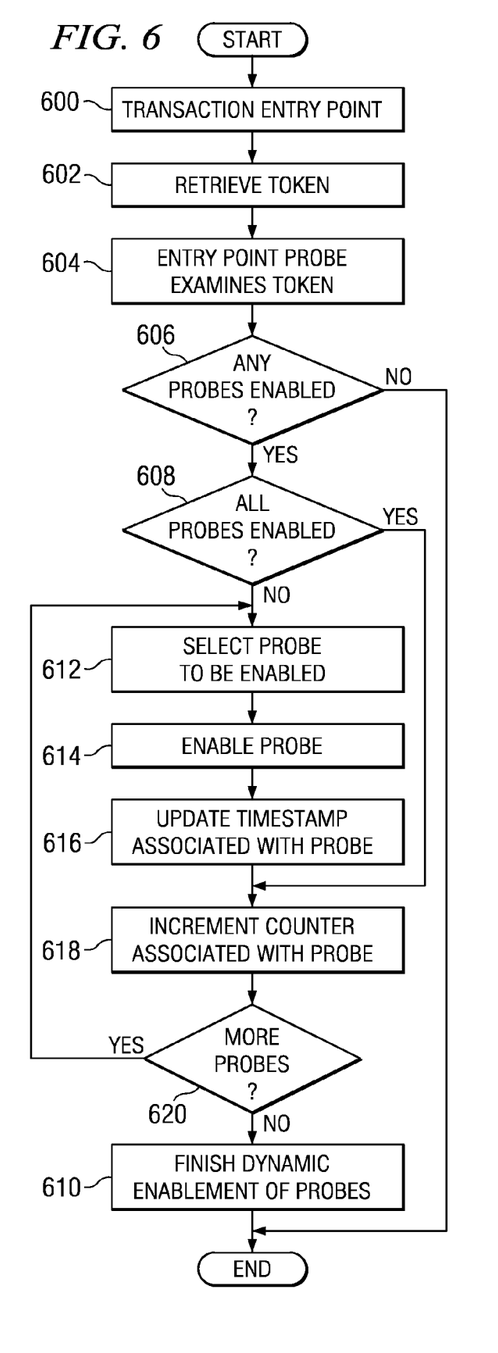
FIG. 6 is a flowchart illustrating a method of using a token and an entry point probe to selectively enable transaction probes associated with a transaction entering an entry point in accordance with a preferred embodiment of the present invention.

FIG. 6 is a flowchart illustrating a method of using a token and an entry point probe to selectively enable transaction probes associated with a transaction entering an entry point in accordance with a preferred embodiment of the present invention. The method shown in FIG. 6 may be implemented in one or more data processing systems, such as server 104 or clients 108, 110, and 112 in FIG. 1, client system 200 in FIG. 2, or server system 300 in FIG. 3. The method shown in FIG. 6 may also be implemented with respect to the illustrative examples shown in FIG. 4 and FIG. 5. The process may be implemented in a primary application, such as primary application 400 in FIG. 4, and may be implemented with respect to an entry point probe, such as entry point probe 430 in FIG. 4, and a transaction probe, such as transaction probe 1 414 in FIG. 4.

The process begins as a transaction enters an entry point (step 600) of a primary application. An entry point probe detects the arrival of the transaction and uses a policy mapping service to retrieve a token associated with the transaction (step 602). The entry point probe then examines or reads data within the token (step 604). Based on data in the token, the entry point probe establishes a set of transaction probes, P={P1, P2, ... Pi ..., PN}, which is a set of transaction probes required to monitor the transaction or perform some other function with respect to the transaction (step 606).

For example, three transaction probes are associated with a primary application. A transaction enters an entry point in the primary application. The associated entry point probe detects the arrival of the transaction and, based on the type of transaction, retrieves a token from a policy mapping service. The token contains three fields. The first field contains a "1," the second a "0," and the third a "1." The entry point probe reads the data in these fields and thereby is prompted to enable the first and third entry probes, but not the second transaction probe. Thus, the set, P, in this illustrative example is P={P1, P3}.

Returning to FIG. 6, the entry point probe makes a determination whether the set, P, is empty (step 608). The set, P, is empty if the token contains no data or contains data indicating that no transaction probes should be enabled. In this case, no transaction probes are enabled and the process terminates. In other words, of all the transaction probes available in the group of available transaction probes, the set of transaction probes selected to be enabled is a null set.

Returning to step 608, if the set, P, is not empty, then the entry point probe examines one transaction probe, Pi, from the set, P (step 610). The entry point probe then makes a determination whether the transaction probe, Pi, is already enabled (step 612). If the transaction probe is already enabled, then the process skips to step 616, described below. If the transaction probe, Pi, is not enabled, the then entry point probe takes steps to enable transaction probe, Pi (step 614). The order in which probes are enabled may vary. The entry point probe may determine the order in which probes are enabled based on data contained within the token.

Optionally, the entry point probe causes a timestamp associated with transaction probe, Pi, to be updated (step 616). The timestamp information may be used later to determine at what time the transaction probe, Pi, may be disabled. The timestamp information may also be used to track how long the transaction probe, Pi, remains active, or for other purposes. The timestamp may be updated when the transaction probe, Pi, is initially enabled or each time the transaction probe, Pi, would be called to be enabled.

Optionally, the entry point probe causes a counter associated with transaction probe, Pi, to be incremented (step 618). The counter may later be used to help determine whether the transaction probe, Pi, should be disabled after a particular transaction ends, as described below. If multiple instances of transaction probes are allowed, then the counter may also be used to track how many instances of the transaction probe, Pi, are currently active.

For example, in the illustrative embodiment shown in FIG. 4, when transaction probe 1 414 is enabled with respect to transaction 1 408, the timestamp associated with transaction probe 1 408 is updated. If transaction 3 412 occurs while transaction 1 408 is still being processed, then the time stamp associated with transaction probe 1 414 is not updated because transaction probe 1 408 is still operating.

In addition, when transaction probe 1 414 is enabled with respect to transaction 1 408, the counter associated with transaction probe 1 is incremented by one. If transaction 3 412 occurs while transaction 1 408 is still being processed, then the counter associated with transaction probe 1 414 is incremented by one again because a second transaction is using transaction probe 1 414. Thus, the counter associated with transaction probe 1 414 is at two. Consequently, the counter indicates how many transactions currently require a particular transaction probe to be enabled.

The counter may be set with regard to all transactions, as in the above example, or the counter may be set with regard to a particular transaction if multiple instances of a transaction probe must be enabled. In this case, multiple instances of a probe may be enabled at the same time and tracked separately. In this case, the counter may be used to count the number of currently running instances of a transaction probe. A second counter may be added to track the number of transactions utilizing an instance of a particular transaction probe.

After incrementing the counter in step 618, the entry point probe determines whether all transaction probes in the set, P, have been enabled (step 620) with respect to the transaction. If all transaction probes have not been enabled with respect to the transaction, then the process returns to step 610 and the process repeats from that point. If all transaction probes in the set, P, have been enabled, then the process terminates as all transaction probes with respect to the transaction are enabled.

Figure 7:
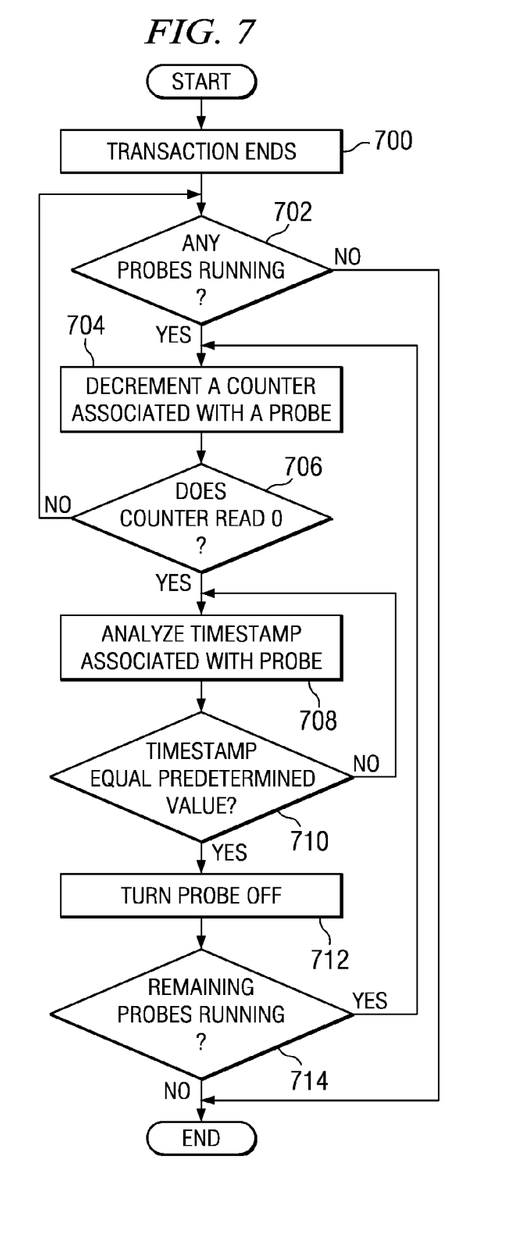
FIG. 7 is a flowchart illustrating a method of tracking which enabled probes are no longer needed for the primary application in accordance with a preferred embodiment of the present invention.
Figure 8:
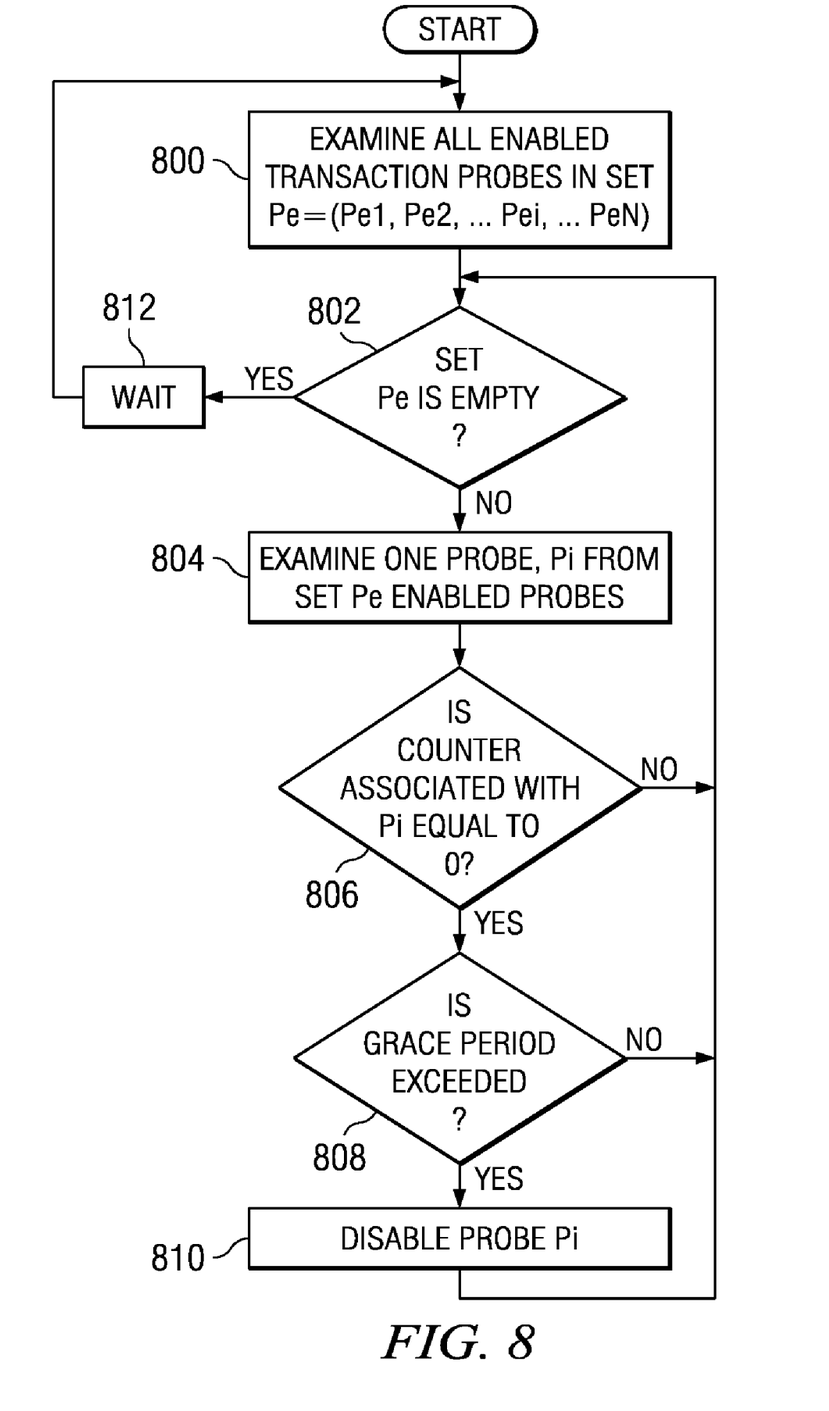
FIG. 8 is a flowchart illustrating a method of selectively disabling transaction probes in accordance with a preferred embodiment of the present invention.

FIG. 7 and FIG. 8 are flowcharts illustrating a method of determining whether to disable one or more transaction probes and how to disable one or more transaction probes. The methods shown in FIG. 7 and FIG. 8 may be implemented in one or more data processing systems, such as server 104 or clients 108, 110, and 112 in FIG. 1, client system 200 in FIG. 2, or server system 300 in FIG. 3. The methods shown in FIG. 7 and FIG. 8 may also be implemented with respect to the illustrative examples shown in FIG. 4 and FIG. 5, and may be implemented after the method shown in FIG. 6. The process may be implemented in a primary application, such as primary application 400 in FIG. 4, and may be implemented with respect to an entry point probe, such as entry point probe 430 in FIG. 4, and a transaction probe, such as transaction probe 1 414 in FIG. 4.

Turning first to FIG. 7, FIG. 7 is a flowchart illustrating a method of tracking which enabled probes are no longer needed for the primary application in accordance with a preferred embodiment of the present invention. The process begins as a transaction at an entry point ends (step 700). The associated entry point probe then examines the set, P, of transaction probes associated with the transaction. For purposes of this illustrative example, all transaction probes associated with the transaction are initially enabled. Thus, the set P={P1, P2, . . . Pi . . . PN} of transaction probes are all currently enabled.

The entry point probe then makes a determination whether the set, P, is empty (step 704). Initially, the set is not empty unless no probes were associated with the transaction. When the set is not empty, the associated entry point probe will remove one transaction probe, Pi, from the set, P, because that transaction probe is no longer required (step 706). Thereafter, the associated entry point probe decrements the counter associated with transaction probe, Pi (step 708). Decrementing the counter associated with Pi indicates that one less transaction requires the use of transaction probe, Pi. Next, the transaction probe, Pi, is removed from the set, P, of transaction probes (step 710). Returning to step 704, a determination is made whether the set, P, is empty. If the set is empty, then all transaction probes associated with the particular transaction have been accounted for, and the process terminates thereafter.

In another illustrative embodiment, the counter is measured with respect to each instance of an operating transaction probe. In this case, multiple instances of transaction probe, Pi, may be operating. However, the counter is still decremented to indicate that one less instance of transaction probe, Pi, is running.

Note that the method described in FIG. 7 does not necessarily require that a probe be disabled. In one illustrative embodiment, each time a transaction probe, Pi, is removed from the set P, the probe, Pi, may be disabled. In another illustrative embodiment, all transaction probes in the set, P, are disabled when the process is complete. In yet another illustrative embodiment, the transaction probe, Pi, is disabled according to the method shown in FIG. 8, below. Each of these methods of disabling a transaction probe may be performed if the counter represents the number of current transactions that require transaction probe, Pi, or if the counter represents the number of currently operating instances of transaction probe, Pi.

FIG. 8 is a flowchart illustrating a method of selectively disabling transaction probes in accordance with a preferred embodiment of the present invention. The process begins as an independent thread of control, referred to as a probe disabler thread, examines a set, Pe={Pe1, Pe2, ... Pei ..., PeN}, of all enabled transaction probes (step 800). The probe disabler thread may be implemented in the form of a program or instructions Initially, the set, Pe, of enabled transaction probes is full because each Pei is currently enabled, though Pe may be empty if no transaction probes are enabled with respect to the primary application. The set, Pe, is empty if no transaction probes are enabled.

Next, the probe disabler thread makes a determination whether the set, Pe, is empty (step 802). Initially, the set, Pe, is full, unless no transaction probes are enabled in relation to the primary application. Thus, associated probe disabler thread will examine one probe, Pei, from the set of enabled probes (step 804). The probe disabler thread determines whether a counter associated with transaction probe, Pei, is equal to zero (step 806). If the counter is not equal to zero, then the process returns to step 802 because at least one transaction requires the transaction probe, Pei.

However, if the counter reflects the number of instances of transaction probe, Pei, that are currently operating, then a separate determination is made whether the particular instance of transaction probe, Pei, should be disabled. If transaction probe Pei should be disabled, then the process continues to step 808 even if the counter does not equal zero. If the transaction probe should not be disabled, or if the counter equals zero, then the process returns to step 802.

After performing step 806, the associated probe disabler thread optionally makes a determination whether a grace period has been exceeded (step 808). The grace period is a predetermined amount of time measured from when transaction probe, Pei, is no longer needed to the current time. The grace period may be any amount of time, though in an illustrative embodiment the grace period is on the order of several minutes, such as five minutes. In some cases, the grace period may be zero, such that the transaction probe may be immediately disabled. The grace period is evaluated by comparing the current time to the timestamp of the transaction probe, Pei. The timestamp is updated as described with respect to FIG. 6. Step 808 is optional because transaction probe, Pei, may be disabled immediately when it is no longer needed.

If the grace period for transaction probe, Pei, has not been exceeded, then the probe is allowed to continue to operate and the process returns to step 802. The grace period allows a transaction probe to continue running where disabling the transaction probe and later enabling the transaction probe requires more data processing resources than running the transaction probe through the grace period.

If the grace period has been exceeded, then the transaction probe, Pei, is disabled (step 810). A separate thread of control is used to disable transaction probe, Pei. A separate thread of control is used so that the act of disabling a transaction probe is a function performed independently of the probe disabler thread, the primary application, or any other transaction probe. The separate thread of control, which may be a hardware thread or a software thread, may be referred to as a probe disabler or a probe disabler tool.

After the probe had been disabled, then the process returns to step 802. The probe disabler thread again determines whether the set, Pe, of enabled probes is empty. If the set, Pe, is empty, then all transaction probes have been disabled.

If the set, Pe, is empty, then the probe disabler thread waits for a period of time (step 812). The period of time may be a few seconds to a few minutes, or more. The period of time may be zero, in which case step 812 is skipped.

After waiting, the probe disabler thread again examines the set of enabled transaction probes. While waiting during step 812, one or more additional transaction probes may have been enabled because of the arrival of a new transaction at a new entry point. For example, the process shown in FIG. 6 could have occurred while the process shown in FIG. 8 was ongoing. Thus, the probe disabler thread continues to monitor for whether newly enabled transaction probes should be disabled. However, the process shown in FIG. 8 may be terminated once the set, Pei, is empty, especially if the primary application is being terminated. In a preferred embodiment, the method shown in FIG. 8 continues to repeat indefinitely as long as the primary application is running and may require the use of transaction probes.

As a result, the mechanism of the present invention has several advantages over currently available methods for enabling and disabling transaction probes associated with a primary application. For example, the mechanism of the present invention allows only needed transaction probes to be selectively enabled and disabled. Thus, the mechanism of the present invention minimizes the amount of overhead transaction probes place on the resources of the data processing system supporting the primary application. Consequently, the primary application is more likely to run faster or more efficiently.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of enabling transaction probes associated with a transaction in a primary application, said method comprising the computer-implemented steps of:
    retrieving a token associated with the transaction, wherein the token contains information for identifying a set of transaction probes from a plurality of transaction probes associated with the primary application, wherein the set of transaction probes represents all transaction probes that are to be enabled with respect to the transaction;
    reading the token to identify the set of transaction probes to be enabled; and
    enabling the set of transaction probes.

2. The method of claim 1 further comprising the step of:
    updating a timestamp associated with each transaction probe within the set of transaction probes.

3. The method of claim 1 further comprising the step of:
    incrementing a counter, wherein additional transactions occur and wherein the counter reflects the number of transactions that require a particular transaction probe.

4. The method of claim 1 wherein the step of reading the token is performed using an entry point probe.

5. The method of claim 1 wherein the step of retrieving a token comprises using an entry point probe to retrieve the token, wherein the entry point probe uses a policy mapper to retrieve the token.

6. The method of claim 1 wherein the token is a collection of fields, said collection of fields indicating whether each transaction probe in the plurality of transaction probes will be enabled.

7. The method of claim 1 wherein the set of transaction probes is a null set.

8. The method of claim 3 further comprising the steps of:
    after enabling the set of transaction probes and after a particular transaction ends, decrementing the counter by one; and
    disabling a particular transaction probe in the set of transaction probes if the counter associated equals zero.

9. The method of claim 3 comprising the further steps of:
    updating a timestamp associated with a transaction probe within the set of transaction probes when the transaction probe is enabled and as each new transaction requiring the transaction probe begins;
    after a particular transaction requiring the transaction probe ends, disabling the transaction probe if both the counter equals zero and a grace period reaches a predetermined value, wherein the grace period is the difference between the current time and the time of the timestamp.

10. A computer program product in a computer readable medium, the computer program product comprising:
    first instructions for retrieving a token associated with the transaction, wherein the token contains information for identifying a set of transaction probes from a plurality of transaction probes associated with the primary application, wherein the set of transaction probes represents all transaction probes that are to be enabled with respect to the transaction;
    second instructions for reading the token to identify the set of transaction probes to be enabled; and
    third instructions for enabling the set of transaction probes.

11. The computer program product of claim 10 further comprising:
    fourth instructions for updating a timestamp associated with each transaction probe within the set of transaction probes.

12. The computer program product of claim 10 further comprising:
    fourth instructions for incrementing a counter, wherein the additional transactions occur and wherein the counter reflects the number of transactions that require a particular transaction probe.

13. The computer program product of claim 10 wherein the second instructions are carried out using an entry point probe.

14. The computer program product of claim 10 wherein the set of transaction probes is a null set.

15. The computer program product of claim 12 further comprising:
    fifth instructions for after enabling the set of transaction probes and after a particular transaction ends, decrementing the counter by one; and
    sixth instructions for disabling a particular transaction probe in the set of transaction probes if the counter associated equals zero.

16. The computer program product of claim 12 further comprising:
    fifth instructions for updating a timestamp associated with a transaction probe within the set of transaction probes when the transaction probe is enabled and as each new transaction requiring the transaction probe begins;
    sixth instructions for after a particular transaction requiring the transaction probe ends, disabling the transaction probe if both the counter equals zero and a grace period reaches a predetermined value, wherein the grace period is the difference between the current time and the time of the timestamp.

17. A data processing system comprising:
    a bus;
    a memory operably connected to the bus, said memory containing a set of instructions,
    a processor operably connected to the bus, wherein the processor is adapted to execute the instructions to:
        retrieve a token associated with the transaction, wherein the token contains information for identifying a set of transaction probes from a plurality of transaction probes associated with the primary application, wherein the set of transaction probes represents all transaction probes that are to be enabled with respect to the transaction;
        read the token to identify the set of transaction probes to be enabled; and
        enable the set of transaction probes.

18. The data processing system of claim 17 wherein the processor is further adapted to execute the instructions to:
    increment a counter, wherein additional transactions occur and wherein the counter reflects the number of transactions that require a particular transaction probe.

19. The data processing system of claim 17 wherein the processor is further adapted to execute the instructions to:
    after enabling the set of transaction probes and after a particular transaction ends, decrement the counter by one; and disable a particular transaction probe in the set of transaction probes if the counter associated equals zero.

20. The data processing system of claim 17 wherein the processor is further adapted to execute the instructions to:

update a timestamp associated with a transaction probe within the set of transaction probes when the transaction probe is enabled and as each new transaction requiring the transaction probe begins;

after a particular transaction requiring the transaction probe ends, disable the transaction probe if both the counter equals zero and a grace period reaches a predetermined value, wherein the grace period is the difference between the current time and the time of the timestamp.

* * * * *